W. I. TWOMBLY.
MOTOR VEHICLE.
APPLICATION FILED JUNE 30, 1910.
1,120,106.
Patented Dec. 8, 1914.
8 SHEETS—SHEET 3.
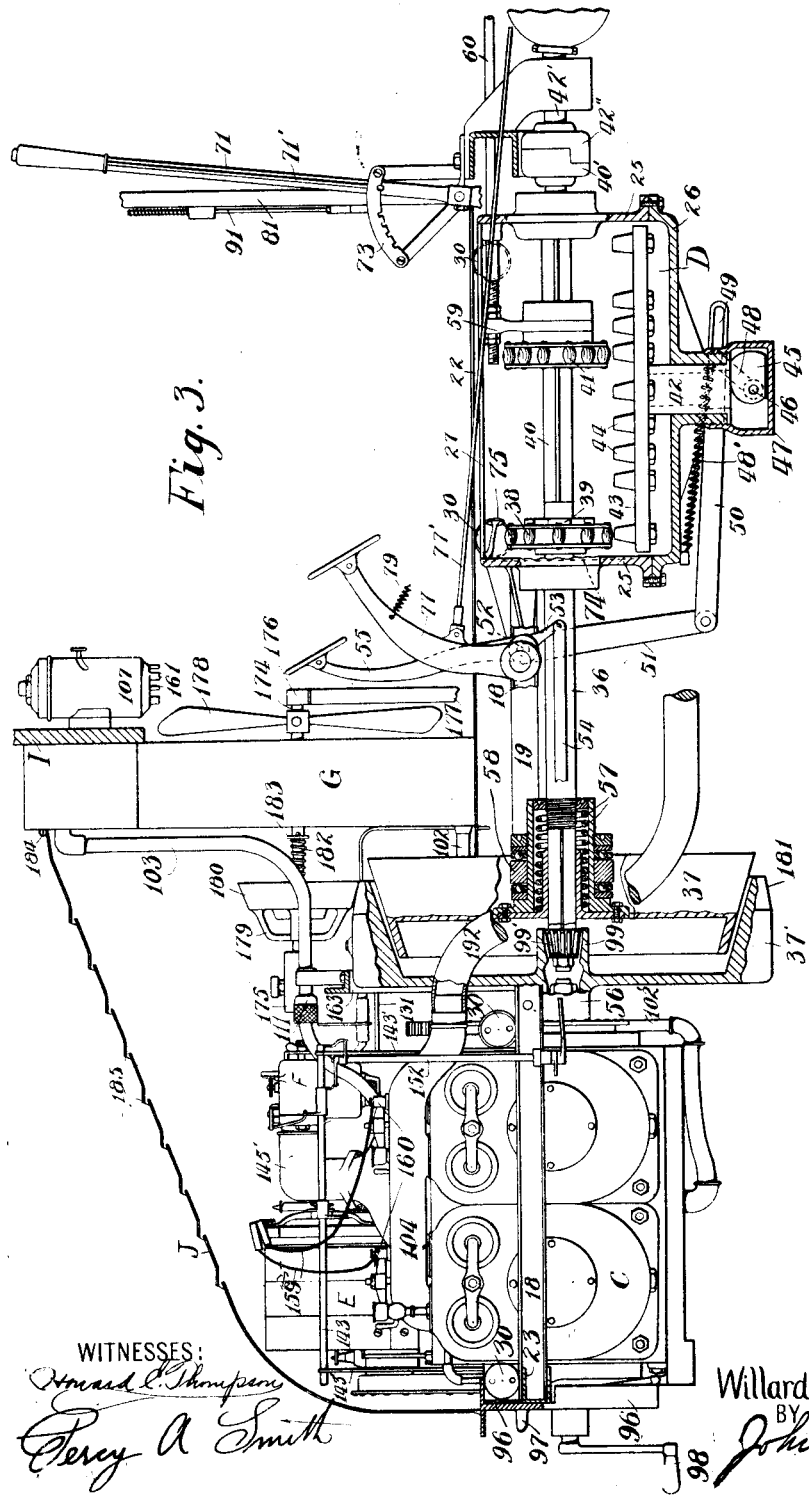
INVENTOR
Willard Irving Twombly
BY John O. Seifert
ATTORNEY

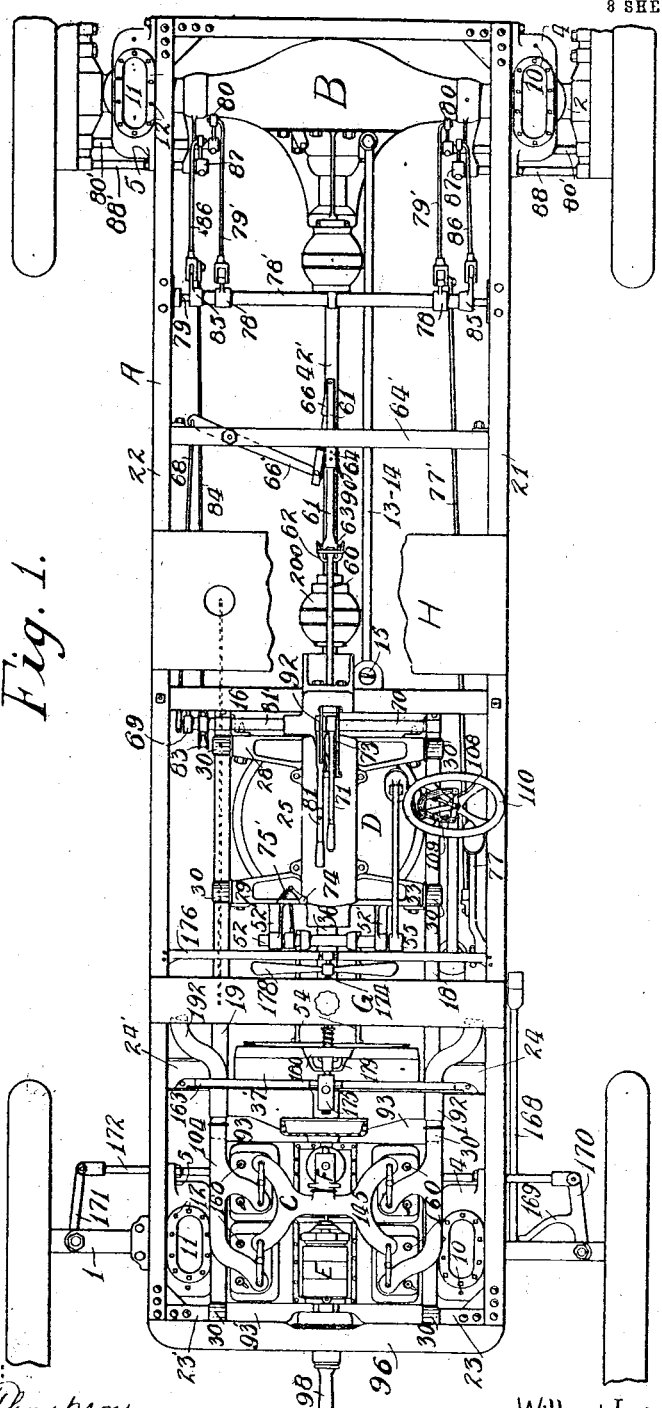

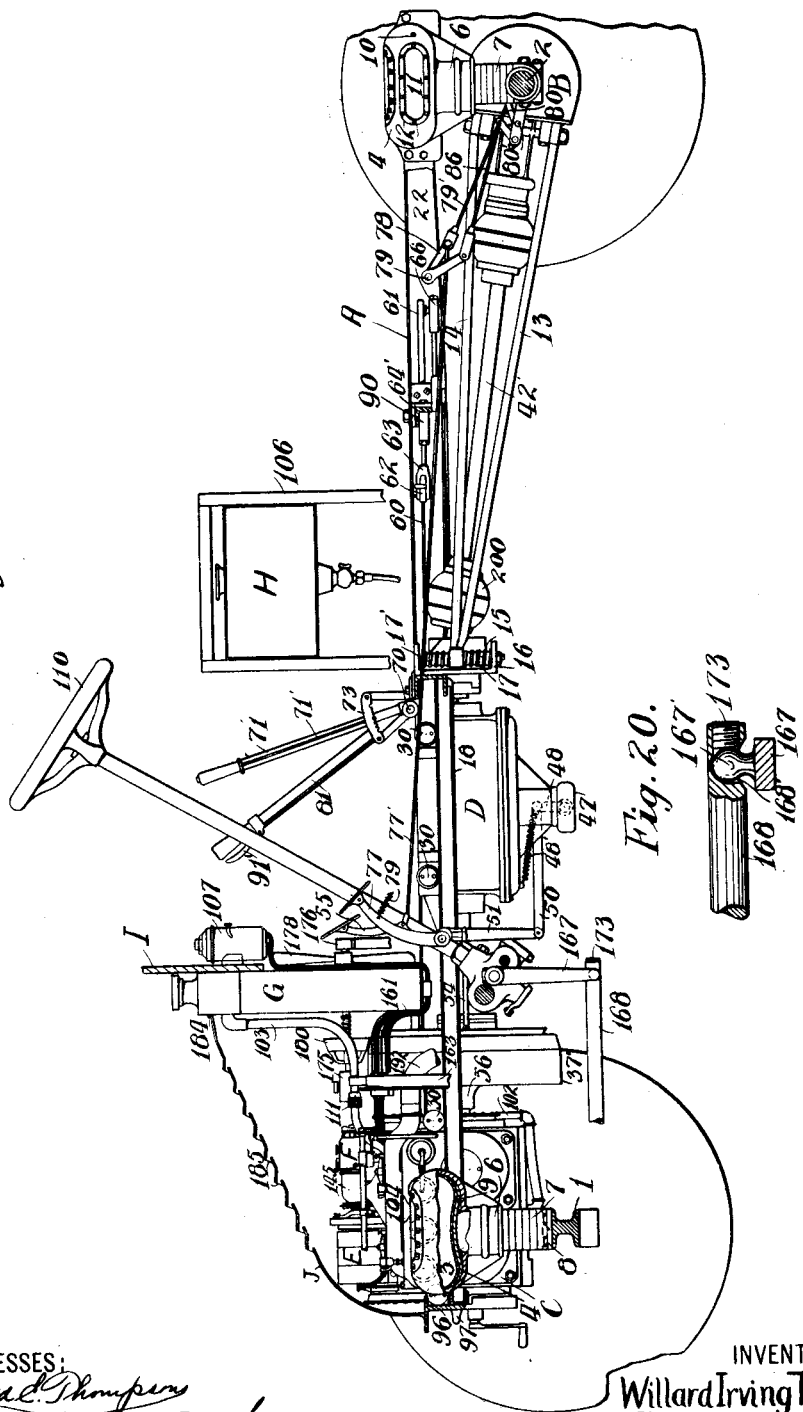

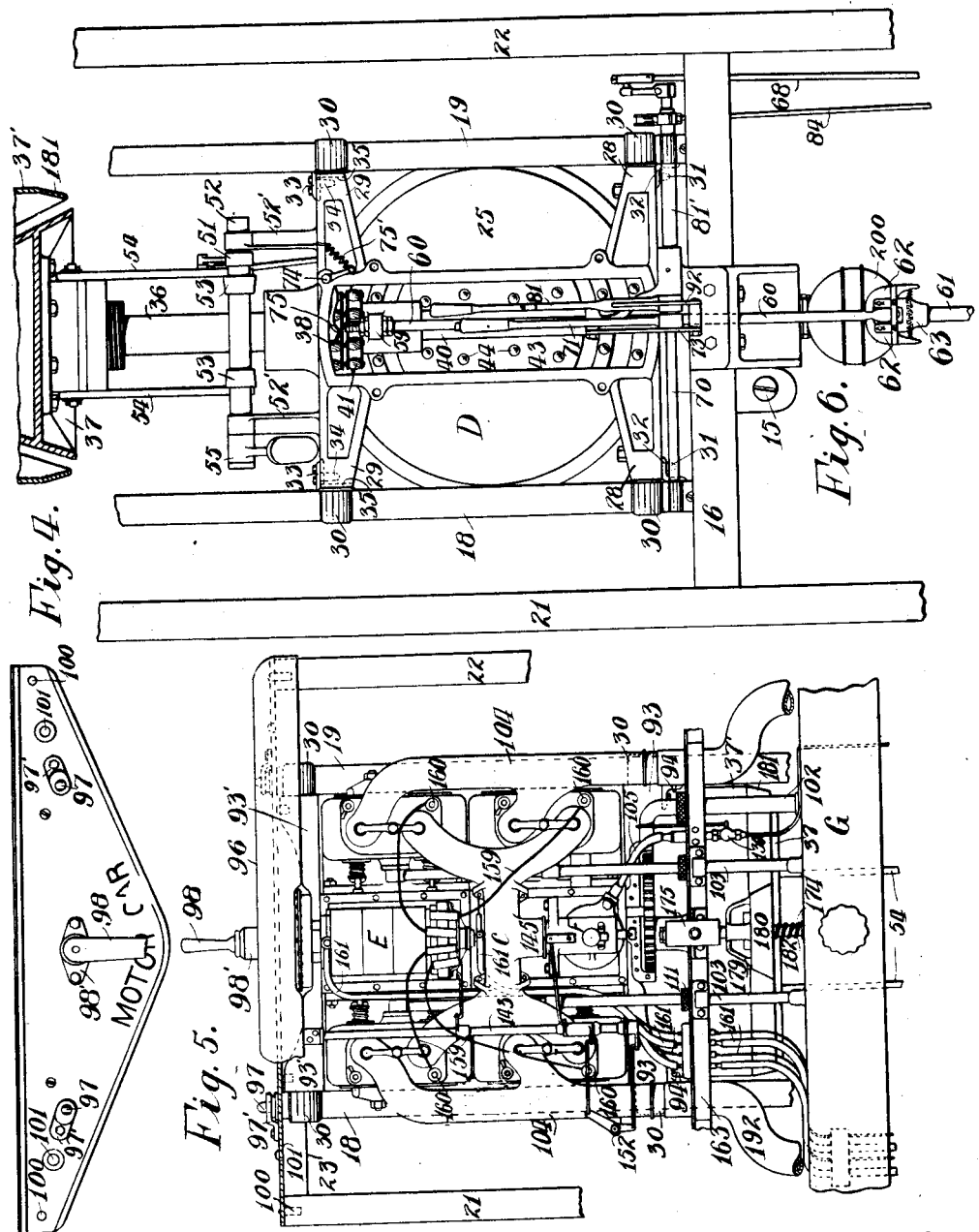

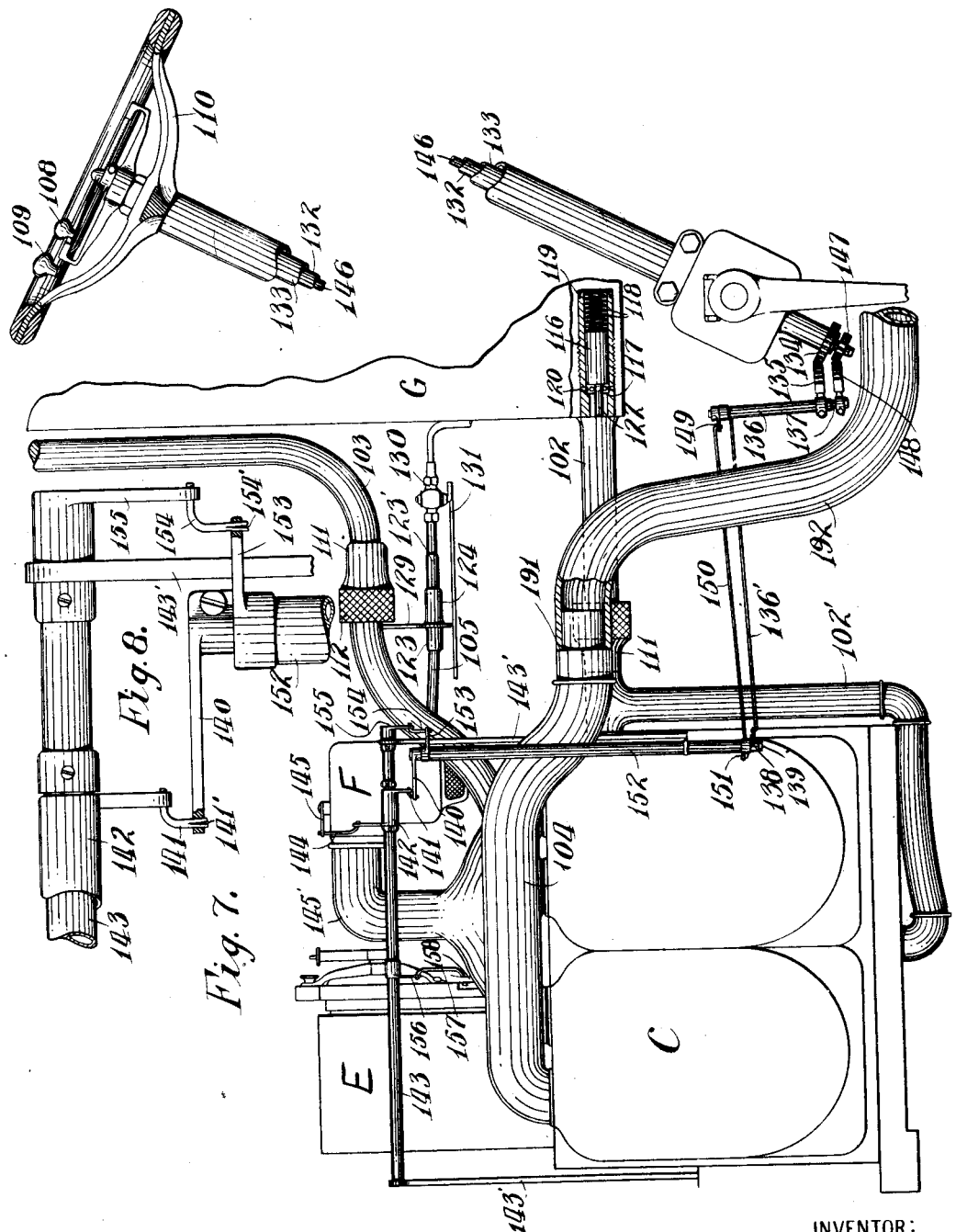

W. I. TWOMBLY.
MOTOR VEHICLE.
APPLICATION FILED JUNE 30, 1910.

1,120,106.

Patented Dec. 8, 1914.
8 SHEETS—SHEET 6.

WITNESSES:
Howard E. Thompson
Perry A. Smith

INVENTOR:
Willard Irving Twombly,
BY John O. Seifert
ATTORNEY

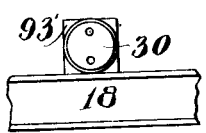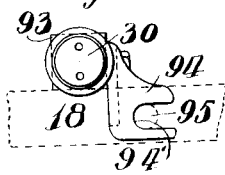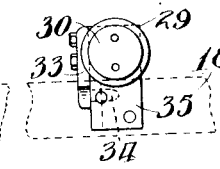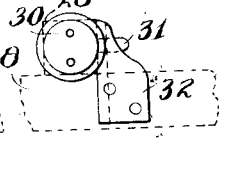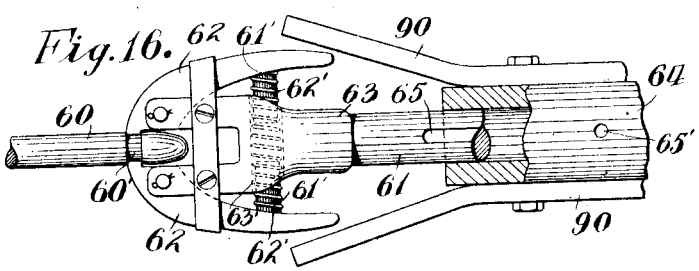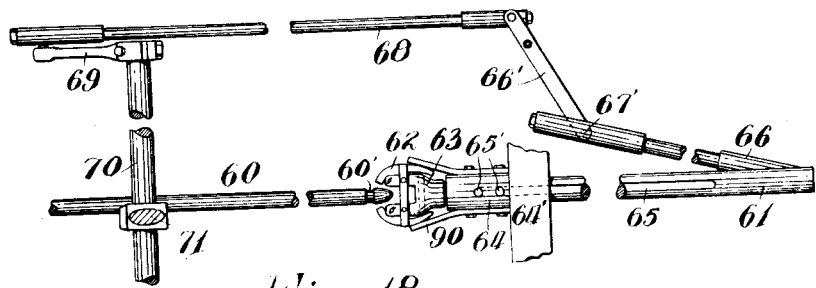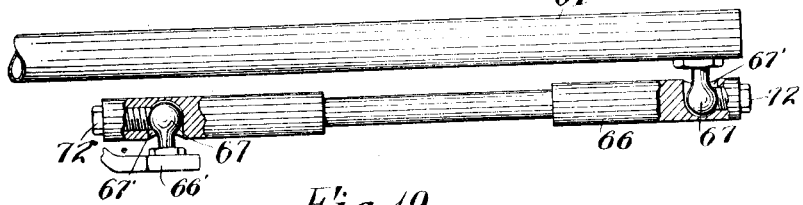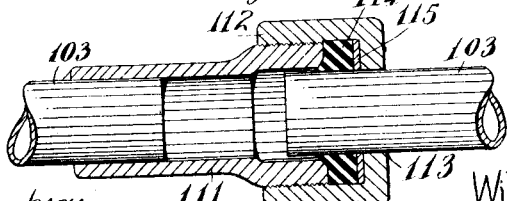

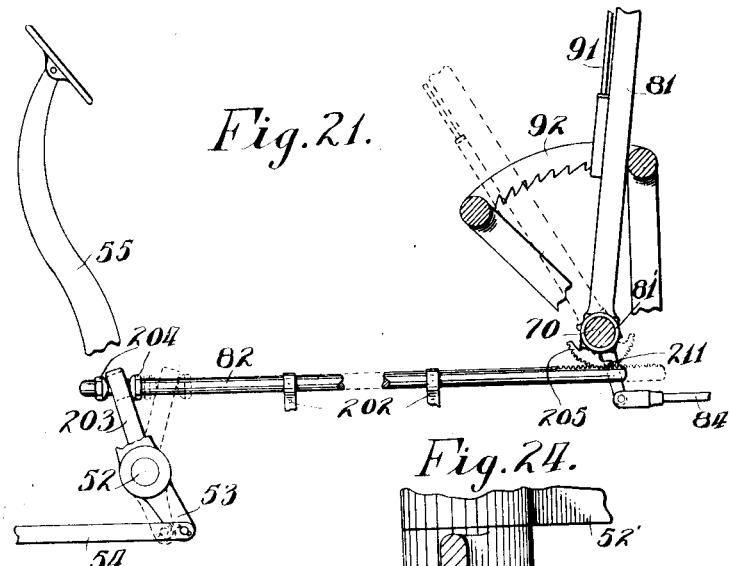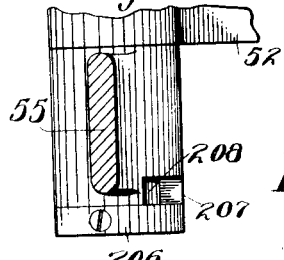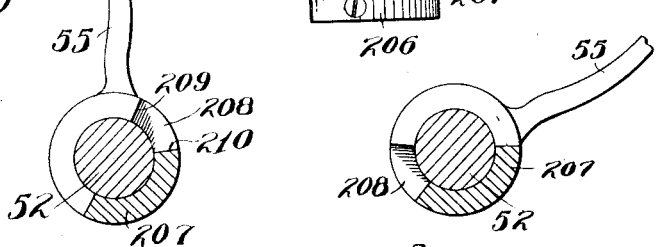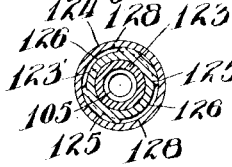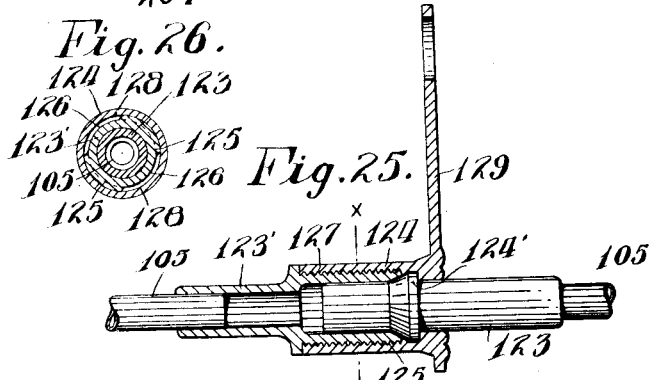

UNITED STATES PATENT OFFICE.

WILLARD IRVING TWOMBLY, OF NEW YORK, N. Y., ASSIGNOR TO TWOMBLY MOTORS COMPANY, OF NEW YORK, N. Y., A CORPORATION OF NEW YORK.

MOTOR-VEHICLE.

1,120,106.     Specification of Letters Patent.     Patented Dec. 8, 1914.

Application filed June 30, 1910. Serial No. 569,678.

*To all whom it may concern:*

Be it known that I, WILLARD IRVING TWOMBLY, a citizen of the United States, residing in the borough of Manhattan, in the city, county, and State of New York, have invented a new and useful Improvement in Motor-Vehicles, of which the following is a specification.

This invention relates to motor vehicles, and particularly to the chassis thereof, and it is the principal object of the invention to provide a chassis consisting of a series of separate, integral, quick removable and interchangeable units.

It is a further object of the invention to provide a quick removable power plant, comprising a separate and integral variable-speed power-transmitting unit and a separate and integral motor unit.

It is another object of the invention to provide means, forming a part of the power transmitting and motor units, whereby to readily place and secure said units in permanent alinement in the frame, and as readily remove the same for the purpose of making repairs or the substituting of another unit.

Further objects of the invention are to provide a chassis of this character with automatic couplings between the motor and power transmitting units, the power-transmitting unit and the vehicle driving mechanism, the motor unit and the water cooler and exhaust muffler, the power-transmitting mechanism and its lever control mechanism carried by the frame, and in the electric conductors between the magneto forming a part of the engine unit and a switch box carried by the frame; and quick-releasable couplings between the motor unit and fuel container, the carbureter and magneto forming a part of the motor unit and their control levers carried by the frame, the steering wheel carried by the frame and forward axle steering mechanism, and a pair of control levers carried by the frame and braking mechanisms connected to the rear axle.

Other objects and advantages will hereinafter appear.

Figure 9:
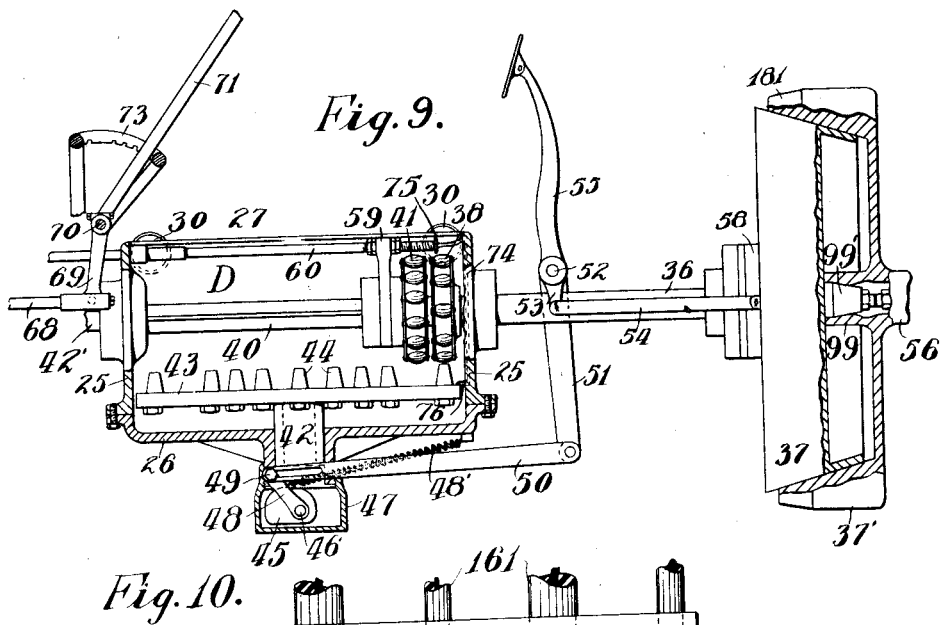
Figure 10:
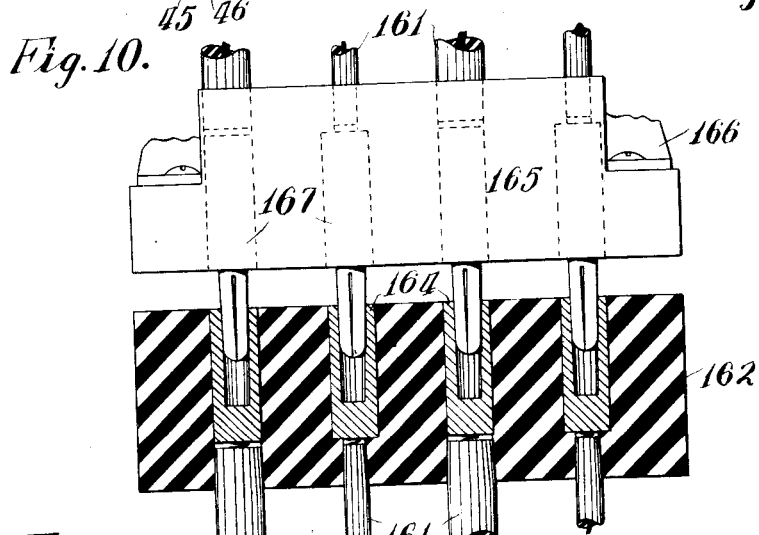
Figure 11:
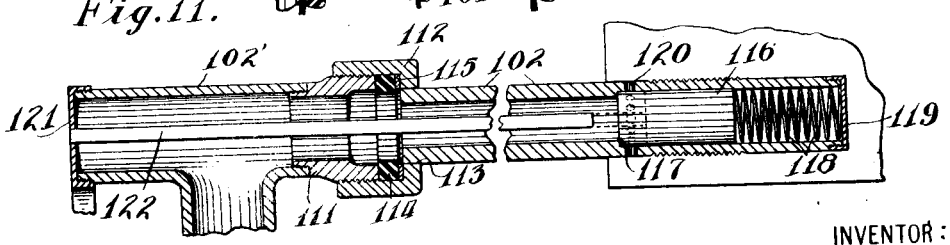

In the drawings accompanying and forming a part of this specification, Figure 1 is a plan view of my improved motor vehicle chassis, the connections between the motor unit and the water cooler and fuel container being omitted. Fig. 2 is a side elevation the framework being shown in sections. Fig. 3 is a side elevation, partly in section, of the removable power plant, illustrating the motor and power transmitting units out of operative relation. Fig. 4 is front elevation of a bar or plate extending across the front of the main frame to maintain the power plant against forward movement. Fig. 5 is a plan view of the motor unit, illustrating the same in operative position in the frame. Fig. 6 is a plan view of the power transmitting mechanism. Fig. 7 is a side elevation to illustrate the automatic couplings between the motor unit and water cooler, and the quick releasable couplings between said motor unit and fuel container; it also illustrates the connection between the lever control mechanism and the carbureter and magneto of the motor unit. Fig. 8 is an enlarged detail view illustrating the quick-releasable connection between the carbureter and magneto of the motor unit and its lever control mechanism. Fig. 9 is a sectional side elevation of the power-transmitting unit, illustrating the same connected up to the clutch of the motor unit and the rear axle driving mechanism coupled for direct drive from the motor unit. Fig. 10 is a side view, partly in section, illustrating the automatic coupling of the electric current conductors between the magneto of the motor unit and the coil and switch box carried by the frame. Fig. 11 is an enlarged sectional side elevation of a detail illustrating the valve in the outlet conduit of the water cooler, and the manner of automatically opening the same when the motor is coupled with said water cooler. Fig. 12 is a detail, in side elevation, of one of the hanger arms and rolls of the motor unit whereby it is supported in the frame. Fig. 13 is a detail, in side elevation, of a lug connected to the frame of the motor unit engaging with a stop pin in the frame. Fig. 14 is a detail, in side elevation, of one of the wheels on one of the forward hanger arms of the power-transmitting unit, and also illustrates one of the alining pins carried by said arms engaging in an aperture in a stop lug fixed to the frame. Fig. 15 is a detail, in side elevation, of one of the wheels connected to one of the rear hanger arms of the power-transmitting unit, and illustrating an alining pin connected thereto engaging in an aperture in a stop lug fixed to the frame. Fig. 16 is a detail view illustrating the automatic coupling between the rod connected to the adjustable gear of the power-transmitting mechanism, and its lever-control mechanism carried by the frame. Fig. 17 is a detail of the lever mechanism for the adjustable gear of the power-transmitting mechanism, illustrating the manner of automatically releasing the coupling therebetween. Fig. 18 is an enlarged detail to illustrate the universal link connection in the lever control mechanism of the power transmission mechanism. Fig. 19 is a detail, in side elevation, illustrating the automatic coupling between the motor unit and water cooler. Fig. 20 is a sectional detail view of one of the universal joints of the lever-controlling mechanism of the power-transmission mechanism. Fig. 21 is a detail partly in section to illustrate the manner of throwing the clutch between the motor and transmission mechanism out of operative relation when the emergency brake is thrown into operation. Figs. 22 and 23 are sectional details to show the manner of mounting the lever for throwing the clutch between the motor and transmission mechanism and said latter mechanism out of operative relation, and whereby said lever may be folded into the transmission mechanism casing when the latter is removed from the frame. Fig. 24 is a plan view of the parts shown in Figs. 21 and 22. Fig. 25 is a detail in sectional side elevation of the quick-releasable coupling in the fuel conduit; and Fig. 26 is a sectional end view taken on the line X—X of Fig. 24.

Similar characters of reference designate like parts throughout the different views of the drawings.

In the form of the invention illustrated in the drawings the chassis comprises a main frame (designated in a general way by A,) supported upon a pair of wheel-axles 1, 2, the rear axle (designated in a general way by B.) having driving mechanism and braking mechanism connected thereto, and the forward axle having steering mechanism connected thereto.

The frame is pneumatically suspended upon the wheel axles by air bags 3 contained in casings 4 fixed to the frame by bolts 5, pistons 7 fixed to the axles by bolts 8 engaging in cylindrical portions of said casings. A pad 9 is interposed between the piston heads and air bags to prevent rupture of the latter by the impact of the piston heads. The air bags are provided with valves 10 for the connection of a pump to inflate the same. Covers 11 for the casings are releasably secured by bolts 12 whereby to get access to the air bags. Torsion rods 13, 14 are connected to the casing of the rear-axle driving mechanism and a pin 15 fixed in a channel bar 16, springs 17, 17' on said pin taking up any distortion or creeping of the rear axle.

The power plant comprises a separate and integral motor unit, (designated in a general way by C,) and a separate and integral variable speed power transmitting unit, (designated in a general way by D). The said units are supported upon an auxiliary or subframe consisting of a pair of tracks 18, 19, one end of which tracks are secured to the bar 16, and by means of brackets 23, 24, 23', 24' to the side members 21, 22. (Fig. 1).

I have shown the power-transmitting mechanism substantially of the type disclosed in my copending application filed March 12, 1910, Serial No. 548,776, carried in a casing comprising upper and lower sections 25, 26, and a removable cover 27. The section 25 has hanger arms 28, 29 with rollers 30 to run upon the tracks 18, 19 and whereby it is mounted and carried in the frame. (Fig. 6). The rear arms have stop lugs with alining pins or dowels 31 to engage in holes or apertures in stop lugs 32, (Fig. 15,) and the forward arms 29 have stop lugs 23 carrying alining pins or dowels 34 to engage in holes or perforations in stop lugs 35 (Fig. 14) out of the path of the rear portion of the casing, said casing abutting against the lugs 32, 35 to limit the backward movement thereof.

The power-transmitting mechanism comprises a drive shaft 36 on which is slidably mounted one member 37 of a friction clutch normally maintained by a spring 57 in frictional engagement with the other clutch member 37' fixed to the shaft of the motor. A roller pinion 38 on said shaft is constructed to also form one member 39 of a jaw clutch. A driven shaft 40 has a roller pinion 41 slidably mounted thereon and constructed with a clutch portion to engage with the clutch member 39. Journaled in a bushing 42 is an intermediate wheel 43 having a series of concentric circles of pins 44 adapted to mesh with the pinions 38, 41 to transmit variable forward and reverse motions to the rear axle. The shaft 40 has an automatic coupling with a "Cardan shaft" 42', consisting of a jaw clutch one member 40' of which is fixed to the shaft 40 and the other member 42'' to the Cardan shaft.

The intermediate wheel 43 is caused to mesh with the pinions 38, 41, by a spring 48' connected to rock-shaft 46 journaled in a cap 47 and having a cam 45 to engage with the stud of the wheel 43, said spring normally tending to rock the shaft 46 and with it the cam 45 to throw and maintain the intermediate wheel 43 in operative relation with the pinions 38, 41. To throw said wheel out of mesh with the pinions, I provide a lever 55 having a foot pedal and fixed to shaft 52, an arm 51 on said shaft through a link 50 having a pin-and-slot connection 49 with shaft 46. A pair of arms 53 on shaft 52 are connected by links 54 to a thrust bearing on the clutch member 37 to throw said clutch out of engagement with its companion clutch member 37' when the transmission mechanism is thrown into operative position. The lever 55 has a slight rearward motion on its shaft to permit folding thereof into the casing of the transmission mechanism.

To adjust the pinion 41 along the shaft to throw it into mesh with either one of the circles of pins on the intermediate wheel 43 to transmit different forward and reverse velocities to the driven shaft 40, or to throw the clutch portions of said pinions into engagement for direct drive, I provide a yoke 59 straddling the hub of the pinion 41, a rod 50 connected to the yoke having an automatic coupling with a rod 61, (Figs. 16, 17,) consisting of a pair of spring actuated lever jaws 62, pivotally connected to a forked member 63 fixed to the rod 61, the jaws adapted to engage with a groove 61' in rod 60 by a spring 62' carried in a bore 63' in the member 63, pins 60' on the jaws engaging with the springs. The rod 61 is slidably mounted in a bracket 64 fixed to a bar 64' and has a slot 65 in which engage pins 65' to prevent rotation thereof. A link 66 has a ball and socket connection 67 with a rod 61 and with a pivoted rocker arm 66', a rod 68 being connected to said latter arm and an arm 69 adjustably mounted upon a rock shaft 70 to which shaft is also connected an operating lever 71. The connections 67 consist of ball-shaped headed pins fixed in the rod 61 and rocker arms 66' engaging in sockets 67' in the link 66 and held therein by screws 72 engaging in the ends of said link. To lock the gear 41 in any of its adjusted positions, the lever is provided with a spring latch to engage with either one of a series of notches or teeth in a fixed rack 73.

The intermediate wheel 43 when the pinions 38, 41 are coupled for direct drive, is locked out of mesh with said pinions by a transverse rock shaft 74 to which is connected a lug or ear 75 to be engaged by the projecting portion of the rod 60, a finger 76 on said shaft 74 thereby being caused to rock over the face of the intermediate wheel and maintained in such position by the engagement of the rod 60 with the ear 75. When the clutch portions of the pinions are thrown out of engagement the finger 76 is caused to swing away from the face of the intermediate wheel by a spring 75' connected to the rock-shaft 74. (Figs. 1 and 6).

To remove the power transmitting unit it is only necessary to throw the lever 71 back as far as possible, which causes the spring-pressed arms of the jaws 62 to engage with the outwardly-flaring fingers 90 fixed to the bracket 64 thereby disengaging the rod 60 and the said unit may then be drawn out, the clutch member 40' pulling away from the clutch member 42'' connected to the Cardan shaft 42'. When the unit is placed in position in the frame the bevel or cone shaped end of the rod 60 will force the jaws 62 apart against the tension of the spring 62' and the rod will slide between said jaws until the groove is reached, when the tension of the spring 62' will cause the jaws to engage with the groove and firmly lock the lever mechanism in operative relation with the rod 16.

The rear axle also has braking mechanism connected thereto, comprising easy and slow-acting or service braking mechanism, and quick-acting and powerful or emergency braking mechanism. To operate the easy and slow acting braking mechanism, a foot pedal 77 or lever is pivotally secured to the frame and to one end of a rod 77', the other end of said rod is connected to one of a pair of arms 78 fixed upon a hollow rock shaft 78', mounted for rotary movement upon the shaft 79. Connected to each of said arms 78 is a link or rod 79' having a quick-releasable connection with arms 80 connected to rocker bars or shafts 80' of the service or easy and slow-acting braking mechanism. The quick-releasable connections between the links 79' and the arms 80 consist of bending the ends of the links at right angles and springing said bent-up portion into an eye in the arms 80. To disconnect the same, all it is necessary to do is to spring the bent-up portion of said links out of engagement with said eyes.

To operate the emergency brake, I provide a lever 81 connected to a hollow rock shaft 81' surrounding the shaft 70, said lever 81 having a releasable latch 91 to engage with a fixed rack 92 to lock it in position. An arm 83 on said shaft 81' is connected to one of a pair of rocker arms 85 fixed upon a shaft 79 by a rod 84, and the arms 85 connected by links 86 with arms 87 fixed upon the shaft 88. The connection between the rods 86 and arms 87 is the same as between the rods 79' and arms 80. The lever 81 also has a connection 82 with the clutch member 37 to throw it into inoperative position when the said brake is thrown into operative position.

In Fig. 2 the lever is shown in its foremost position, the braking mechanism being in inoperative position. To throw the said braking mechanism into operation pressure is applied to the hand-piece 91' releasing the latch 91 from the rack 92, by now giving a rearward pull to the lever 81 the arm 83 is rocked and through the rods 84 and 86 connected to the arms 85 and 87 rocking the shafts 88 throwing the said braking mechanism into operation. Simultaneously with the throwing into operation of the said braking mechanism by the lever 81 the clutch member 37, through its link connection 82 with said lever 81, is thrown out of operative relation with its companion clutch member 37'. To release the braking mechanism the lever 81 is thrown to its initial Fig. 2 position, and simultaneously therewith the clutch members 37, 37' are thrown into operative relation by the spring 57.

The motor unit C occupies a position in the frame in front of the power-transmitting mechanism unit D, in the present instance comprising a water cooled internal combustion engine of the opposed cylinder type, as disclosed in my co-pending application filed February 18, 1910, Serial Number 544,546. A magneto E and a carbureter (designated in a general way by F,) are connected to the motor unit.

The frame of the engine has lateral hanger arms 93, 93', rollers (designated by 30) similar to the rollers 30 on the hanger arms of the power transmission unit and mounted upon the extremity of said arms 93, 93' to run upon the sub-frame or tracks 18, 19 and whereby the motor unit is supported in the frame. Each of the rear arms 93 is provided with lugs or ears 94, (Fig. 13) having open slots 94' in which engage stop pins 95 projecting inwardly from the tracks 18, 19 out of the path of the transmission mechanism casing, the end of the slots 94' abutting against said pins 95 to limit the backward movement of the motor unit in the frame and also preventing any lateral movement thereof.

To maintain the transmission mechanism and motor units in the frame against forward endwise movement and against the stop lugs 32, 35 and stop pins 95 I provide a plate or bar 96 extending across the front of the engine frame and secured to the end of the sub-frame by means of bolts and nuts 97, the nuts being carried by retainers or housings 97' fixed to said plate to avoid any liability of losing the nuts when the plate is detached. The plate is also provided with a perforation through which the end of the crank shaft of the engine extends to be engaged by a crank 98 rotatively mounted in and carried by a boss 98' fixed to said plate. By tightening up the nuts 97 the motor unit is drawn up against the transmission unit until a bearign 99, internally beveled or cone shaped, in the hub of the clutch member or fly wheel 37' engages with a roller bearing 99' connected to the end of the shaft 36, the inclination or bevel of the bearings 99, 99' preventing any forward endwise movement of the transmission mechanism unit. The plate 96 is also provided with a pair of dowels or alining pins 100 near the ends thereof to engage in sockets in the side bars of the main frame, and a pair of dowels or alining pins 101 carried by the brackets 23, 23' to engage in apertures in said plate 96, the said dowels 100 and 101 tending to maintain the side bars of the main and sub-frame in parallel alinement.

The motor unit is provided with automatic couplings in conduits 102, 103 leading to and from said unit and a water cooler, (designated in a general way by G), carried by the main frame; in the manifold exhaust conduits 104 leading from said units to mufflers (not shown); and in the electric current conductors leading to and from the magneto E and a switch box or coil 107 carried by the framework of the vehicle body; with quick releasable couplings in the conduit 105 leading from the fuel container (designated in a general way by H) carried under the seat 106 of the vehicle body, and between the carbureter (designated in a general way by F) and magneto E of said unit and control mechanism including levers 108 and 109 carried by the steering wheel 110.

The couplings of the conduits 102 and 103 are substantially similar, the one in the conduit 103 (Fig. 19) consisting of a nipple 111 with which a knurled cap 112 having a perforation 113 has screw threaded connection, said cap clamping a rubber gasket 114 and metal washer 115 between said cap and the end of the nipple; one section of the conduit 103 is adapted to engage in the perforation of the cap and is forced into the hole in the rubber gasket, which firmly engages with the conduit making a water tight connection between the two conduit sections.

One section of the conduit 102 extends into the cooler and is provided with a valve comprising a plug 116 caused to normally engage a shoulder 117 by a spring 118 between the plug and a screw threaded cap 119 to close a series of openings or orifices 120 when the engine is disconnected from the cooler. The other section has a T-portion 102' the end of which is closed by a cap 121 to which is connected a rod 122 to abut against the valve 116 when the sections are coupled together to force said plug away from its seat 117 to uncover the openings 120 and open communication between the water cooler and water jacket of the engine.

The coupling of the fuel conduit 105 comprises a pair of tubular members 123, 123', the member 123 engaging in a sleeve 124 and having a flange 124' to abut against a shoulder in said sleeve; the other member 123' having a ground joint connection with the flange and externally screw threaded, as at 125, with non-threaded portions 126. The sleeve 124 is internally screw threaded, as at 127, with non-threaded portions 128. To couple the sections together the sleeve is adjusted so that the screw threads thereon and on the member 123' will come opposite the non-threaded portions when the sleeve is slipped along the member 123', and by giving it a slight turn by the handpiece 129 the conduit sections will be firmly locked together. The conduit also has a spring-actuated valve 130 which is normally closed when the engine is disconnected, but as the engine is placed in the frame a tappet or rod 131 will engage with the handle of the valve and force it open.

The connection between the carbureter and control lever 109 comprises a hollow shaft 132 to which the lever 109' is connected and mounted for rotary movement within the post 133 of the steering wheel, the said shaft 132 having a segmental pinion or rack 134 at its lower end which meshes with a companion pinion or rack 135 connected to a hollow rock shaft 136, surrounding a rock shaft 137. The rock shaft 136 has a link connection 136' with a rock arm 138 fixed to the lower end of the shaft 139 having an arm 140, which latter arm has a quick-releasable link connection 141 with an arm on a rocker sleeve 142 mounted to have rotary movement on the shaft 143, said shaft 143 mounted in brackets 143' fixed to and carried by the engine frame. Another arm on the sleeve 142 has a link connection 144 with a lever 145 of the throttle-valve of the carbureter F, connected to a manifold fuel-intake conduit 145' leading to the engine.

The connection between the magneto E and its control lever 108, comprises a shaft 146 to which the lever 108 is fixed, said shaft extending through the hollow shaft 132 and having at its lower end a segmental pinion or rack 147 meshing with a pinion or rack 148 fixed to the shaft 137, a rock arm 149 on said shaft having a link connection 150 with a rocker arm 151 fixed to the lower end of a hollow shaft 152 surrounding and mounted on the shaft 139, said shaft 152 having a quick-releasable link connection 154 with an arm 155 on the shaft 143; a second arm 156 on said shaft 143 has a link connection 157 with the timing lever 158 of the contact breaker of the magneto E.

The connections between the links 141, 154 and the arm 140, 153 are clearly illustrated in Fig. 8, and consist in splitting the ends of the links and spreading them apart to form spring fingers to frictionally engage in holes or sockets in the arms 140, 153.

The bell crank 167 of the steering-wheel mechanism has a quick-releasable ball-and-socket connection with a reach-rod 168 connected to an arm 169 on the knuckle 170 of the forward axle steering mechanism, the said knuckle being connected to the knuckle 171 of the other wheel by a link or rod 172, said connection comprises a ball 167' formed on the end of the crank 167 engaging in a socket 168 and held therein by a screw 173 engaging in the end of said rod.

The engine or the motor unit is provided with a dual ignition system, comprising the magneto E and a series of batteries (not shown) connected up through the switch box and coil 107 carried by the frame, with electric current conductors 169 from the magneto to spark plugs 160. The magneto and switch box 167 are connected by means of electric current conductors 161. Automatic couplings are provided in said conductors, (Fig. 10,) comprising a block of insulating material 162 fixed to a bar 163. To secure the conductors in said block I provide socketed plugs 164 to which the conductors 161 are attached. The other part comprises a block of insulating material 165 carried by a bracket 166, plugs 167 to which the conductors 161 are attached extending through said plugs with the projecting ends provided with resilient or springy fingers. The block 165 is so mounted on the engine frame that when it is slid into place, the plugs 167 will engage in the sockets in the plugs 164.

A shaft 174 is rotatably mounted in bearings 175, 176 fixed to cross bars 163, 177 to extend through the water cooler G, and has a fan 178 fixed thereto in back of the water cooler. Rotary motion is imparted to said fan by a wheel 179 slidably mounted on shaft 174 in front of the water cooler, the face of said wheel being beveled or cone shaped, as at 180, to frictionally engage with a beveled face 181 on the fly-wheel or clutch member 37', which may be provided with some suitable friction material. A spring 182 coiled about the shaft 174 between the hub of the wheel and a collar 188 is tensioned to force and maintain the bevel face of the wheel in contact with the fly-wheel.

Hinged to the water cooler, as at 184, is a sheet metal hood J to entirely close the top of the motor unit, and supported upon the main frame and transverse plate 96, and is provided with openings or orifices 185, the fan 178 drawing air therethrough.

From the foregoing description and reference to the drawings it will be obvious that I have produced a motor vehicle chassis consisting of a series of separate, integral, quick removable and interchangeable units with automatic and quick releasable couplings between the said units and their associated mechanism. The frame A with the water cooler G, fuel container H and control levers 71, 81 and 77 and the steering wheel 110 with the connected levers 108, 109 carried by said frame constituting one unit; the rear axle with the Cardan shaft, and brake and driving mechanisms connected thereto constituting another unit; the forward axle with the connected steering mechanism constituting another unit; and the power plant comprising a separate and integral motor unit C and a variable speed power transmitting mechanism unit D.

Should it be desired to remove the motor unit for the purpose of making repairs or the substitution of another unit, the nuts 97 are released and the plate 96 pulled off from the pins 101, the pins 100 fixed to the plate drawing out from their sockets in the frame; the handle 129 of the coupling in the fuel conduit 105 is then given a slight turn to unlock the screw threads of the sleeve 124 with the screw threads on the coupling member 123' and the sleeve slid to the left. The links 141, 154 of the magneto and fuel control lever mechanisms are then pulled out of their sockets in the arms 140, 153 disconnecting said lever mechanisms from the motor unit. The unit is then drawn out from the front of the frame, the rollers 30 on the hanger arms rolling along the sub-frame or tracks 18, 19, the water conduit leading from the motor drawing out of the coupling 112, and the water conduit leading from the water cooler drawing out from its coupling, the manifold-exhaust conduit 104 of the engine having a slip-joint connection 191 with the muffler conduit 192 slipping out of the same, and the pins 167 in the block 165 of the connection for the electric conductors 161 pulling out from the sockets in the plugs 164 in the block 162. Simultaneously with the drawing of the motor unit forward the rod 131 will be pulled away from the handle of the valve 130 in the fuel-conduit causing said valve to be automatically closed by its spring and shutting off the flow of fuel from the tank H; the rod 122 being pulled away with the conduit section 102 connected to the motor frame from engagement with the plug valve 116 the latter will be forced against its seat 117 by the spring 118 closing the openings 120 shutting off the flow of water from the water cooler. The bearing 99 in the fly wheel or clutch member 37' is so constructed that the roller bearings 99' will readily slip out from said bearing 99. The said motor unit is as readily replaced, the manifold-exhaust conduit, water and fuel conduit sections connected to said unit being so supported by the framework thereof, and their companion sections mounted upon the main frame, so that as the motor unit is rolled into place in the frame they will always register or aline with each other. Simultaneously with the connecting of the different conduits the rod 131 will engage with the handle of the valve 130, and the rod 122 in the conduit 102 will force the plug valve 116 away from its seat, opening both of said valves; the sleeve 124 is then slipped along the member 123' on the fuel conduit and given a slight rotary motion locking the same firmly together, the links 141, 154 are then snapped into the sockets in the arms 140, 153, and the slots 94' in the lugs 94 engaging with the pins 95 when the motor unit will again be coupled up in operative relation in the frame, and maintained therein by securing the plate 96 in place.

To remove the power transmitting mechanism unit, the motor unit is first removed in the manner described. The lever 71 is then thrown back, through its rearmost position pulling the rod 61 back, through its connected link mechanism, so that the spring-actuated jaws 62 come into engagement with the arms 90 (Fig. 17) throwing the jaws out of engagement with the groove 60' in the rod 60. The lever 55 is then folded down into the transmission mechanism casing (Fig. 23,) to clear the bottom of the water cooler, and the said casing drawn out forward from the frame, the clutch member 40' pulling out of engagement with the Cardan-shaft clutch member 42'', the rollers 30 rolling along the sub-frame or tracks 18, 19, the alining pins 31, 34 pulling out from the apertures in the stop lugs 32, 35. To replace the transmission mechanism unit, it is only necessary to slide it into the frame the alining pins 31, 34 registering with the apertures in the stop lugs 32, 35 and against which the casing abuts. As the said unit is slid into place the beveled end of the rod 60 of the slide gear 41 will force the jaws 62 apart and slide between said jaws until they reach the groove 60' when the springs 62' will cause the jaws to snap into said groove connecting the change gear 41 with its lever operating mechanism. The jaw clutch members 40', 42'' are automatically coupled as the transmission mechanism casing is slid into place. The motor unit is then placed in the frame in the manner hereinbefore described, and the bar or plate 96 secured in place.

In Fig. 21 I have illustrated the connection between the clutch member 37 and the lever 81 of the emergency braking mechanism, to throw the clutch between the motor and power transmitting units out of operative relation when the emergency braking mechanism is thrown into operation. The parts are shown in full lines in the positions they assume when the brake mechanism is in operation and the clutch thrown out of operative position, and in dotted lines the normal idle positions. The connection comprises a rod 82 slidably mounted in a pair of upright arms 202 which are fixed to the upper section 25 of the power-transmitting casing, one end thereof engaging within a slot in a rocker arm 203 ed to the shaft 52, the connection between said rod and the arm 203 consisting of a pair of lock nuts 204. The other end of the rod 82 is provided with rack teeth 211 meshing with a segmental gear on rack 205 connected to the lever 81. When the lever 81 is thrown to inoperative position the clutch member 37 is caused to again engage with its companion clutch member by the spring 57.

In Figs. 22 to 24, inclusive, I have shown the manner of mounting the pedal lever 55 upon the shaft 52, so that the said lever will have a slight free motion to permit of the folding thereof into the transmission mechanism casing to clear the bottom of the water cooler when said casing is withdrawn from the frame of the chassis. The hub of said lever is rotatively mounted on the shaft 52 between the arm 52' extending out from the casing section 25 and a collar 206 fixed to said shaft. The collar is provided with a segmental projection 207 to engage in a segmental cut-out portion 208 in the hub of the lever. The cut-out portion 208 is of greater extent than the projection 207, as from the end 209 thereof to the end of the projection 210, (Fig. 22,) to permit of the moving of said lever from the position shown in said figure to the position shown in Fig. 23. The lever is normally held in the Fig. 22 position and maintained therein in any suitable manner, as by a spring, not shown.

Variations may be resorted to within the scope of the invention, and portions of the invention may be used without others.

Having thus described my invention, I claim:

1. In a motor vehicle, the combination with the chassis frame, of a power plant, comprising a power-transmitting mechanism the casing of which is provided with lateral arms whereby it is supported in the frame, and a motor also provided with lateral arms whereby it is supported in the frame; said power-transmitting mechanism and motor adapted to be placed separately in position in the frame from the front thereof and automatically coupled in operative relation when the motor is placed therein; stops to limit the movement of the power-transmitting mechanism and motor into the frame and prevent lateral movement thereof; a transverse bar releasably connected to the frame to prevent forward endwise movement of the power transmission mechanism in the frame; a clutch between the power-transmitting mechanism and motor; and means connected to the clutch members coöperating to prevent forward axial movement of the power-transmitting mechanism relative to the motor.

2. In a motor vehicle, the combination with the chassis frame, of a removable power plant, comprising a power-transmitting mechanism the using of which is provided with laterally projecting arms having rollers to run upon the frame and whereby it is supported therein, and a motor in front of the power-transmitting mechanism also provided with laterally projecting arms having rollers to run upon the frame and whereby it is supported therein; said power-transmitting mechanism and motor adapted to be rolled separately into position from the front of the frame and automatically coupled in operative relation when the motor is placed in the frame; a clutch between the power-transmitting mechanism and motor, one member of which clutch is fixed to the power shaft of the motor and the other member slidably mounted on the drive shaft of the power-transmitting mechanism, and a bearing member connected to the drive shaft of the power-transmitting mechanism to engage in a bearing in the hub of the motor-clutch member when the motor is placed in position to prevent forward axial movement of the power-transmitting mechanism relative to the motor, stops to limit the movement of said mechanism and motor into the frame and prevent lateral movement thereof; and a bar extending transversely of the frame connected to the motor and releasably connected to the frame provided with means to draw the motor and power-transmitting mechanism up against the stops and lock the power plant in the frame against forward endwise movement.

3. In a motor vehicle, a main frame, a sub-frame comprising a pair of tracks fixed to the main frame, a removable power plant comprising a power-transmission mechanism the casing of which is provided with laterally-projecting arms, rollers on said arms to run upon the sub-frame and whereby the power-transmission mechanism is supported in the frame, a motor in front of the power-transmission mechanism the frame of said motor having laterally-projecting arms, rollers on said arms to run upon the sub-frame and whereby the motor is supported in the frame; the power transmission-mechanism and the motor adapted to be rolled into position from the front of the vehicle frame and automatically coupled in operative relation when the motor is placed in the frame; stops on the power-transmission mechanism and the motor to coöperate with stops on the frame to limit the inward movement of said mechanism and motor and maintain them in coupled position in the frame with the centers in permanent alinement, and means to maintain the power plant in the frame, comprising a locking bar extending transversely across the front of the frame, bolts connected to the sub-frame and projecting through apertures in said bar, nuts carried by said bar to engage with the bolts to releasably connect the bar to the frame, and alining pins carried by said bar to engage in sockets in the main frame; said bolts and alining pins preventing any distorting of the main and sub-frames.

4. In a motor vehicle, a main frame; a sub-frame comprising a pair of tracks fixed to the main frame; a power-transmitting mechanism the casing of which is provided with laterally-projecting hanger arms; rollers on said arms to run upon the sub-frame and whereby the power-transmitting mechanism is supported in the frame; stops on the frame to limit the rearward movement of the power-transmitting mechanism into the frame, said stops having perforations; pins or dowels carried by the power-transmitting mechanism to engage in the perforations in the stops to maintain the said mechanism in alinement; a motor the frame of which is provided with laterally-projecting hanger arms; rollers on said arms to run upon the sub-frame and whereby the motor is supported in the frame; coöperating stops on the frame out of the path of the power transmitting mechanism and on the motor to limit the rearward movement of the motor; and a bar extending transversely across and releasably connected to the frame to maintain the power plant in assembled position in the frame.

5. In a motor vehicle, the combination with the main frame having a water cooler, a fuel container, and a system of control levers mounted thereon, and a pair of wheel axles upon which the frame is supported, one of said axles having driving mechanism connected thereto, of a sub-frame comprising a pair of tracks fixed to and parallel with the side members of the main frame; a removable power plant comprising a power-transmitting mechanism and a motor, the casing of the power-transmitting mechanism and the frame of the motor having laterally-projecting arms; rollers on said arms to run upon the sub-frame and whereby the power plant is supported therein; a friction cone clutch between the motor and power-transmitting mechanism; coöperaive stops on the frame and power plant to maintain the latter in position in the frame with the centers in permanent alinement; and a locking bar extending transversely across the front of the frame releasably connected thereto to maintain the power plant in the frame; automatic and expansion couplings between said motor, the water cooler and fuel container; a jaw clutch between the power-transmitting mechanism and axle-driving mechanism which is automatically thrown into operative engagement when the power-transmitting mechanism is rolled into the frame; quickly releasable couplings between the control levers, motor and power-transmitting mechanism.

6. In a motor vehicle, the combination with the main frame having a water cooler, a fuel container, and a system of control levers mounted thereon, and a pair of wheel axles upon which the frame is supported, one of said axles having driving mechanism connected thereto, of a sub-frame comprising a pair of tracks fixed to and parallel with the main frame; a removable power plant, comprising a power-transmitting mechanism and a motor, the casing of the power-transmitting mechanism and the frame of the motor having laterally-projecting arms; rollers on said arms to run upon the sub-frame and whereby the power plant is supported in the frame; a friction cone clutch between the motor and power-transmitting mechanism; automatic and expansion couplings between said motor, the water cooler and fuel container; a jaw clutch between the power-transmitting mechanism and axle-driving mechanism which is automatically thrown into operative engagement when the power-transmitting mechanism is rolled into the frame; quick releasable couplings between the control levers, motor and power-transmitting mechanism; means to maintain the power plant in coupled position in the frame with the centers in permanent alinement; spring actuated valves in the conduits between the motor, the water cooler and fuel container which are automatically closed when the motor is removed from the frame; and tappets carried by the motor to engage with and automatically open the valves when the motor is placed in position in the frame.

7. In a motor vehicle, the combination with the main frame having a water cooler, a fuel container and a system of control levers fixed thereto, and a pair of wheel axles upon which the frame is supported, the rear axle having driving mechanism connected thereto, of a sub-frame comprising a pair of tracks fixed to and parallel with the side members of said main frame; a removable power plant, comprising a power-transmitting mechanism and a motor, the casing of the power-transmitting mechanism and the frame of the motor having lateral arms; rollers on said arms to run upon the tracks whereby the power plant is supported in the frame; conduits with automatic and expansion couplings between the motor, the water cooler and fuel container; a jaw clutch between the power-transmitting mechanism and rear-axle driving mechanism which is automatically thrown into operative engagement when the power plant is placed into the frame; a clutch between the power-transmitting mechanism and motor, one member of the clutch fixed to the power shaft of the motor, and the other member slidably mounted on the drive shaft of the power-transmitting mechanism; a lever carried by the power-transmitting mechanism to throw the clutch out of operative relation; and quick releasable couplings between the control levers and the power plant.

8. In a motor vehicle, the combination with the chassis frame, of a power plant carried by said frame to be removed and placed in position from the front thereof, comprising independently removable motor and power-transmitting mechanism units; means to maintain the power plant in assembled position in the frame with the centers of the motor and power transmitting units in permanent alinement; a normally disconnected clutch between the motor and power-transmitting units; and means connected to said clutch to prevent forward axial movement of the power transmitting mechanism relative to the motor.

9. In a motor vehicle, the combination with the frame and a pair of wheel axles upon which said frame is supported, of a removable power plant adapted to be placed in position from the front of the frame comprising an independently removable motor and power-transmitting mechanism, the frame of the motor and the casing of the power-transmitting mechanism having lateral arms; whereby the power plant is supported in the frame; pins connected to the casing of the power-transmitting mechanism to engage with apertures in the frame and pins on the frame to engage in slots in the motor frame to maintain the centers of the motor and power transmitting mechanism in permanent alinement; and a releasable locking bar extending transversely across the front of the frame, to maintain the power plant in assembled position in the frame.

10. In a motor vehicle, the combination with the frame and a pair of wheel axles upon which said frame is supported, one of said axles having driving mechanism connected thereto, of a quick removable power plant carried by said frame, comprising a separately removable motor and power transmitting mechanism, the casing of the power-transmitting mechanism and the frame of the motor having lateral arms whereby the power plant is supported in the frame, stops on the frame against which the motor and power-transmitting mechanism abut to limit the movement thereof into the frame; stops on the motor and power-transmitting mechanism to coöperate with the stops on the frame to maintain the centers of the power plant in permanent alinement, a clutch between the power-transmitting mechanism and axle-driving mechanism; and a releasable bar extending across the front of the frame to maintain the power plant in assembled position in the frame, the said bar having a flange portion to engage over the forward end of the motor frame to maintain it in position on the frame.

11. In a motor vehicle chassis, the combination with the frame open at the front, and a pair of wheel axles upon which said frame is supported, one of said axles having driving mechanism connected thereto; of a quick removable power plant adapted to be slid into and out from the front of the frame, comprising an independently removable motor and power-transmitting mechanism, the motor and the casing of the power-transmitting mechanism having lateral hanger arms whereby they are supported in the frame; means to maintain the power plant in the frame with the centers in permanent alinement, comprising stops on the frame to limit the inward movement of the power plant, alining pins carried by the power-transmitting mechanism to engage in apertures in said stops, lugs on the motor frame to engage with said stops, and a releasable bar extending across the front of the frame; pins on the motor frame engaging in apertures in said bar and pins on said bar engaging in sockets in the frame to prevent spreading of the side members of the frame; a jaw clutch between the power-transmitting mechanism and rear-axle driving mechanism; and a friction cone clutch between the motor and the power-transmitting mechanism.

12. In a motor vehicle, the combination with the frame and a pair of wheel axles upon which said frame is supported, one of said axles having driving mechanism connected thereto, of a quick removable power plant carried by said frame, comprising an independently removable engine and power-transmitting mechanism, the frame of said engine and casing of the power-transmitting mechanism having lateral arms whereby they are supported in the frame; coöperating stops on the engine, power transmitting mechanism and frame which are thrown into engagement as the power plant is placed in the frame to maintain the centers of said power plant in permanent alinement; a releasable bar extending across the front of the frame to maintain the power plant therein; a jaw clutch between the power-transmitting mechanism and axle driving mechanism which is automatically thrown into operative engagement when the power-transmitting mechanism is placed in position in the frame; a friction clutch between the engine and power-transmitting mechanism; and a lever carried by the power-transmitting mechanism and connected to the clutch between said mechanism and engine to throw and maintain the clutch out of operative relation; said lever foldable into the power-transmitting mechanism casing to permit the withdrawal from and placing of the same in the frame.

13. In a motor vehicle, the combination with the frame and a pair of wheel axles upon which said frame is supported, one of said axles having driving mechanism connected thereto, of a quick removable power plant carried by said frame, comprising an independently removable motor and power-transmitting mechanism, the said motor and power-transmitting mechanism having lateral arms whereby they are supported in the frame, alining pins connected to said power-transmitting mechanism to engage apertures in the frame and lugs on the motor frame having slots to engage with pins on the frame, whereby to maintain the centers of said power plant in permanent alinement; a jaw clutch between the power-transmitting mechanism and axle-driving mechanism which is automatically thrown into operative engagement when the power plant is placed in position in the frame; a friction clutch between the motor and power-transmitting mechanism; and a lever carried by the power-transmitting mechanism and connected to the clutch between the said mechanism and motor to maintain the clutch out of operative relation and simultaneously therewith throw the mechanism of the transmission to inoperative position.

14. In a motor vehicle, the combination with the main frame carrying a water cooler and a fuel tank, of a pair of tracks parallel with and connected to the said members of said frame; a power-transmitting mechanism the casing of which has outwardly-extending arms provided with rollers to run upon said tracks and whereby said mechanism is supported in the frame; a motor the frame of which also has outwardly-extending arms with rollers to run upon the tracks and whereby said motor is supported in the frame in front of the power-transmitting mechanism; means to maintain the centers of said motor and power-transmitting mechanism in permanent alinement; means to automatically couple the motor with the power-transmitting mechanism; and conduits with automatic and expansion couplings between the motor, water cooler and fuel tank.

15. In a motor vehicle, the combination with the main frame open at the front, of a pair of tracks parallel with and connected to the side members of said frame; a power-transmitting mechanism adapted to be rolled into and out from the front of the frame; rollers connected to the casing of said mechanism to run upon and whereby the said mechanism is supported on the tracks; a motor having rollers connected thereto to run upon and whereby the motor is supported on the tracks, said motor occupying a position in front of the power-transmitting mechanism; stop lugs on the frame having apertures or openings; positioning pins on the power-transmitting mechanism casing to engage in the apertures in the stop lugs to rigidly maintain said casing against endwise and sidewise movement; stop pins carried by the tracks; lugs on the frame of the motor having open slots to engage with said pins; and a locking bar extending across the front of the motor casing and secured to the frame to maintain the motor and power-transmitting mechanism in assembled position in the frame.

16. In a motor vehicle, the combination with the main frame, of a sub-frame fixed to the main frame in the form of a pair of tracks parallel with the side members of the frame; a power-transmitting mechanism the casing of which has outwardly-extending arms; rollers on said arms to run upon the tracks and whereby the power-transmitting mechanism is supported in the frame; alining pins or dowels carried by said casing; stop lugs on the sub-frame having openings in which the alining pins engage to maintain said mechanism in permanent alinement and limit the movement thereof into the frame; a motor the frame of which also has outwardly-extending arms; rollers on said arms to run upon the tracks and whereby the motor is supported in the frame to occupy a position in front of the power-transmitting mechanism; lugs on the motor frame provided with alining slots; stop pins on the sub-frame to engage in the slots in said lugs to maintain said motor against lateral movement and limit the movement of the motor into the frame; and a locking bar extending across the front of said motor and secured to the frame to maintain the power-transmitting mechanism and motor in assembled position in the frame.

17. In a motor vehicle, the combination with the main frame, of a sub-frame fixed to the main frame in the form of a pair of tracks parallel with the side members of the frame; a power-transmitting mechanism, the casing of which has outwardly-extending arms at the rear and front thereof, rollers on said arms to run upon the tracks and whereby the power-transmitting mechanism is supported in the frame; alining pins or dowels connected to the rear arms of said casing; stop lugs on the sub-frame against which the power-transmitting mechanism abuts to limit the movement thereof into the frame, said lugs having openings in which the alining pins engage; alining pins or dowels carried by the forward arms; lugs on the sub-frame out of the path of the rear portion of the casing and against which the casing abuts, said lugs having openings in which said alining pins engage; said lugs and dowels maintaining the power-transmitting mechanism in permanent alinement in the frame; a motor the frame of which also has outwardly-extending arms; rollers on said arms to have rolling engagement with the sub-frame and whereby it is supported therein, said motor occupying a position in front of the power-transmitting mechanism; lugs on said motor frame provided with alining slots; positioning pins on the sub-frame out of the path of the power-transmitting mechanism casing to engage in the slots in the motor frame; lugs to limit the movement of the motor into the frame and maintain the center of said motor in permanent alinement with the center of the power-transmitting mechanism and a clutch between the motor and power-transmitting mechanism; and a releasable locking bar extending across the front of the motor and secured to the frame to maintain the motor and power-transmitting mechanism in assembled position in the frame, said bar also having alining pins to register with apertures in the main frame, and alining pins on the motor frame engaging with apertures in said bar to prevent distorting of the frame.

18. In a motor vehicle, the combination with the main frame, of an auxiliary frame comprising a pair of tracks fixed to the main frame; a removable power plant comprising a power-transmitting mechanism the casing of which has laterally-extending arms with rollers to run upon the tracks and whereby it is carried in the frame, and an engine the frame of which also has laterally-extending arms with rollers to run upon the tracks and whereby it is carried in the frame; and means to maintain said engine and power-transmitting mechanism rigidly in the frame with the centers in permanent alinement, comprising alining pins carried by the power-transmitting mechanism casing to engage apertures in stop lugs on the frame and against which the said casing abuts, stop pins on the auxiliary frame, lugs on the engine frame having slots in which the latter stop pins engage, and a bar extending across the front of the engine frame and releasably secured to the main frame.

19. In a motor vehicle, the combination with the main frame, of an auxiliary frame comprising a pair of tracks fixed to the main frame; a quick removable power plant, comprising a power-transmitting mechanism the casing of which has laterally-extending arms with rollers to run upon the tracks and whereby it is carried in the frame, and an engine the frame of which also has laterally-extending arms with rollers to run upon the tracks and whereby it is carried in the frame; and means to maintain said power-transmitting mechanism and engine rigidly in the frame with the centers in permanent alinement, comprising alining pins carried on the rear end of the power-transmitting mechanism casing, stop lugs on the main frame and against which the said casing abuts, said lugs having perforations in which the said alining pins engage, alining pins carried on the forward end of said casing, lugs or stops on the auxiliary frame out of the path of the rear end of the casing against which the casing also abuts, said lugs also having perforations in which the last mentioned alining pins engage, stop pins in the auxiliary frame out of the path of the power-transmitting mechanism casing, lugs on the engine frame having open slots to engage with the latter stop pins, a releasable bar extending across the front of the engine frame and secured to the auxiliary frame, alining pins carried by said bar to engage in sockets in the main frame, and alining pins connected to the main frame to engage in perforations in said bar, the said pins preventing spreading of the frame members.

20. In a motor vehicle, the combination with the main frame and a pair of wheel axles, the rear axle having driving mechanism connected thereto, of an auxiliary frame comprising a pair of tracks fixed to the main frame; a removable power plant comprising a power-transmitting mechanism the casing of which has laterally-extending arms, rollers on said arms to run upon the tracks and whereby said mechanism is carried in the frame, a jaw clutch between the power-transmitting mechanism and a Cardan shaft forming a part of the axle-driving mechanism, and an engine the frame of which also has laterally-extending arms, rollers on said arms to run upon the tracks and whereby the engine is carried in the frame; a friction clutch between the power-transmitting mechanism and engine; and means to maintain said power-transmitting mechanism and engine in permanent alinement in the frame, comprising alining pins carried by the power-transmitting mechanism casing to engage with perforations in stop lugs on the main frame and against which the casing abuts, stop pins in the auxiliary frame engaged by open slots in lugs on the engine frame, and a bar extending across the front of the engine frame and releasably secured to the main frame.

21. In a motor vehicle, the combination with the frame carrying a water cooler, a fuel container, an electric switch box, and a series of control levers, and a pair of wheel axles upon which said frame is supported, the rear axle having driving mechanism connected thereto, of a power plant, comprising a power-transmitting mechanism and an engine; a magneto connected to the engine; a jaw clutch between the power-transmitting mechanism and the rear-axle driving mechanism; a clutch between the engine and power-transmitting mechanism; automatic couplings in inlet and outlet conduits leading from and to the engine and water cooler; a spring-actuated valve in the outlet conduit of the water cooler which is automatically closed as the engine is removed from the frame; a tappet carried by the conduit section leading to the engine to engage with and automatically open said valve when the engine is placed in the frame; a conduit leading from the fuel container to the engine; a quick releasable coupling in said conduit; a spring-actuated valve in that section of the conduit leading from the fuel container which is automatically closed as the engine is removed from the frame; a tappet carried by the frame of the engine to engage with and automatically open the valve when the engine is placed in the frame; electric current conductors leading from and to the switch box and magneto; and an automatic coupling in said conductors to automatically couple the conductors when the engine is placed in the frame.

22. In a motor vehicle, the combination with the main frame open at the front and carrying a water cooler, a fuel container, electric switch box and a series of control levers, and a pair of wheel axles upon which said frame is supported, the rear axle having driving mechanism connected thereto, of a quick removable power plant adapted to be slid into and out from the front of the frame comprising a power-transmitting mechanism and an engine; a magneto connected to and carried by the engine; a jaw clutch between the power-transmitting mechanism and the rear axle driving mechanism; an automatic coupling between the operating rod and the change speed gear of the power transmitting mechanism and its operating lever which is thrown into operative engagement when the said mechanism is placed into the frame; a clutch between the engine and power-transmitting mechanism, inlet and outlet conduits leading from and to the engine and water cooler; automatic and expansion couplings in said conduits; a spring actuated valve in the outlet conduit of the water cooler; a tappet carried by the conduit leading to the engine to engage with and automatically open said valve when the engine is placed in the frame and coupled to the water cooler; a conduit leading from the fuel container to the engine; a quick releasable coupling in said conduit; a spring-actuated valve in the section of the conduit leading from the fuel container; a tappet carried by the engine to automatically open the valve when the engine is placed in the frame; electric current conductors leading from and to the switch box and magneto; and automatic couplings in said conductors to automatically couple the conductors when the engine is placed in the frame.

23. In a motor vehicle, the combination with the frame open at the front and a pair of wheel axles upon which said frame is supported, of a power plant adapted to be placed into, and removed from, the front of the frame, comprising an independently removable motor and power-transmitting mechanism; stops on the frame; stops carried by the motor and power-transmitting mechanism and coöperating with the frame-stops to limit the movement of the said motor and mechanism into the frame and also prevent lateral movement thereof; a bar extending across the front of and releasably connected to the frame to maintain the power plant in assembled position in the frame; a clutch between the motor and power-transmitting mechanism, one member of said clutch fixed to the shaft of the motor and having a cone-shaped bearing in the hub thereof the other member slidably mounted on the drive shaft of the power-transmitting mechanism; and a beveled bearing on the end of the drive shaft of the power-transmitting mechanism to engage in the cone-shaped bearing of the clutch member fixed to the shaft of the motor to maintain the power-transmitting mechanism in the frame against forward endwise movement.

24. In a motor vehicle, the combination with the frame open at the front, of a power plant adapted to be placed into and removed from the front of the frame, comprising an independently removable motor and power-transmitting mechanism; stops on the frame; stops on the motor and power-transmitting mechanism to engage with the frame-stops to limit the movement of the power plant into the frame and prevent lateral movement thereof; a releasable bar extending across the front of the frame to maintain the power plant in assembled position therein; manually operable lever mechanism carried by the frame; and a coupling between the said lever mechanism and the power-transmitting mechanism, comprising a pair of spring-pressed jaws carried by the lever mechanism adapted to automatically engage with the operating rod of the change-speed gear of the power-transmitting mechanism as it is placed into the frame.

25. In a motor vehicle, the combination with the chassis frame, of a power plant comprising independently removable motor and power transmitting mechanism units carried by said frame to be removed and placed in position from the front thereof; coöperating stops carried by the power plant and the frame to limit the movement of the power plant into the frame and maintain the power plant in assembled position in the frame with the centers of the motor and power transmitting mechanism in permanent alinement; a clutch between the motor and power transmitting mechanism; and a bar extending transversely of the front of, and detachably connected to, the frame to maintain the power plant in the frame against forward endwise movement.

WILLARD IRVING TWOMBLY.

Witnesses:
 JOHN O. SEIFERT,
 HOWARD C. THOMPSON.